Figure 1:
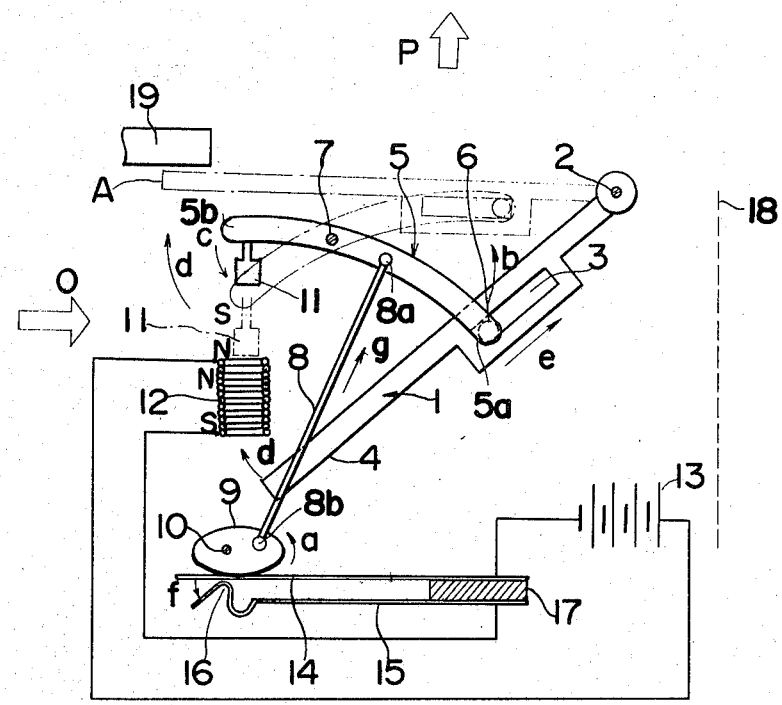

United States Patent [19]
Eukuda

[11] 3,852,791
[45] Dec. 3, 1974

[54] VIEWFINDER MIRROR BUFFER DEVICE FOR A SINGLE-LENS REFLEX CAMERA

[75] Inventor: Susumu Eukuda, Hyogo, Japan

[73] Assignee: Fuji Photo Film Co., Ltd., Kanagawa-ken, Japan

[22] Filed: Aug. 31, 1973

[21] Appl. No.: 393,364

[30] Foreign Application Priority Data
Sept. 4, 1972  Japan.............................. 47-88439

[52] U.S. Cl. ............................................. 354/152
[51] Int. Cl. ............................................. G03b 19/12
[58] Field of Search ........ 95/42; 354/152, 153, 155, 354/156, 154

[56] References Cited
UNITED STATES PATENTS

| | | | |
|---|---|---|---|
| 3,507,199 | 4/1970 | Sato | 95/42 |
| 3,673,935 | 7/1972 | Coughlan | 95/42 |
| 3,699,865 | 10/1972 | Erlichman | 95/42 |

Primary Examiner—Samuel S. Matthews
Assistant Examiner—Alan Mathews
Attorney, Agent, or Firm—Sughrue, Rothwell, Mion, Zinn & Macpeak

[57] ABSTRACT

In a single-lens reflex camera having a viewfinder mirror a buffer device for the mirror comprising a magnet which is moved together with the mirror and an electromagnetic means which is actuated when said mirror is moved to approach the electromagnetic means to produce a force opposing the movement of the mirror, thereby to make it possible to effectively eliminate impact and noise in the high-speed rotation of the mirror.

6 Claims, 4 Drawing Figures

VIEWFINDER MIRROR BUFFER DEVICE FOR A SINGLE-LENS REFLEX CAMERA

The present invention relates to single-lens reflex cameras, and more particularly to an electronically controlled buffer device which eliminates shock to a mirror used for through the lens viewing in a single lens reflex camera, when said mirror is moved to permit a photograph to be taken.

In single-lens reflex cameras, a photographer views a scene to be photographed by means of mirror which is placed in a suitable location in the camera's lens assembly, facing the film plane, and is inclined at an angle of 45° to the optical axis of the lenses. This mirror reflects the image of a scene to be photographed at rightangles to the optical axis of the lens assembly to a viewfinder, and except at the moment of exposure, provides partial or total protection of the film from light. At this moment of exposure, the mirror must be swung upwards in order to permit light to reach the film plane.

This movement of the mirror must be at a speed which matches that of the shutter, in other words, the movement must be extremely rapid. A problem associated with the construction of single-lens reflex cameras has been the necessary of providing a suitable braking means for preventing shock to the mirror and noise of the operation, when the mirror is swung upwards. This has been a problem particularly in single-lens reflex cameras, what is known as a 6×6 viewfinder, wherein the size of the scene viewed through the viewfinder is exactly the same as that taken by the film. The viewing mirror used in this type of camera is large, and when it is moved out of the way to permit exposure of a frame, there is a distinct shock, which can cause a photographer to jolt the camera slightly and when an instant-return type mirror is used, its movement results in distinct clicks which hinder concentration.

As a device of resolving this problem, it has been known conventionally to provide devices for buffering mirror movement. But these conventional buffer devices are all of mechanical construction, and therefore they are subject to wear and loss of effectiveness after a certain time, and also that they further increase the complication of camera construction.

It is accordingly an object of the present invention to provide an improved mirror buffer device for a single-lens reflex camera, which overcomes the defects inherent in conventional, mechanical device for lessening the impact resulting from mirror movement, and which comprises an electromagnetic control means which is actuated simultaneously with mirror movement which effectively cushions at least the final stage of a mirror's movement.

The device of the present invention has the advantage that the electromagnetic means provides a large controlling force for cushioning mirror movement much more easily than is possible with mechanical means, and also makes it possible to apply this cushioning force precisely at any desired moment, for example, just before a mirror comes to rest. The device of the present invention therefore makes it possible to effectively eliminate impact and noise in the high-speed rotation of a viewfinder mirror in a single-lens reflex camera, without in any way hindering mirror action.

The present invention has the further object of providing an electromagnetic buffer device which, unlike conventional means, avoids impact, wear, and loss of efficiency of working parts, and so provides a mirror buffer device that is long-lasting, and eliminates shock or noise which could disturb a photographer's concentration, or cause a photographer to jolt the camera at the moment of exposure.

Figure 4:
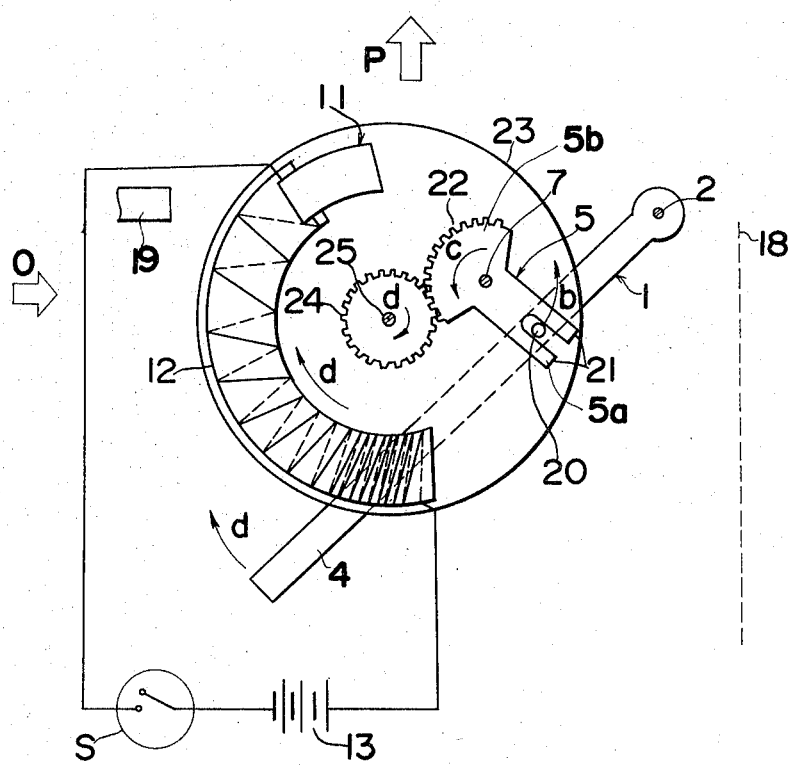
Figure 2:
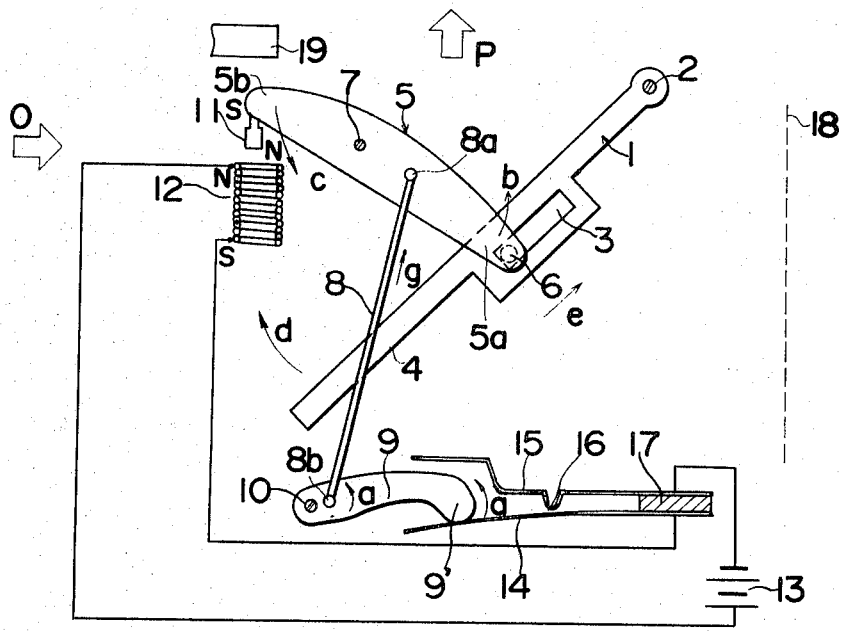
Figure 2:
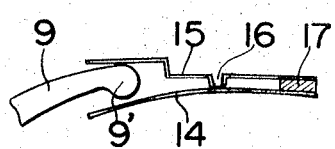
Figure 2:
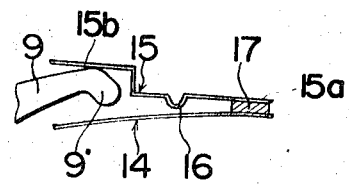
Figure 3:
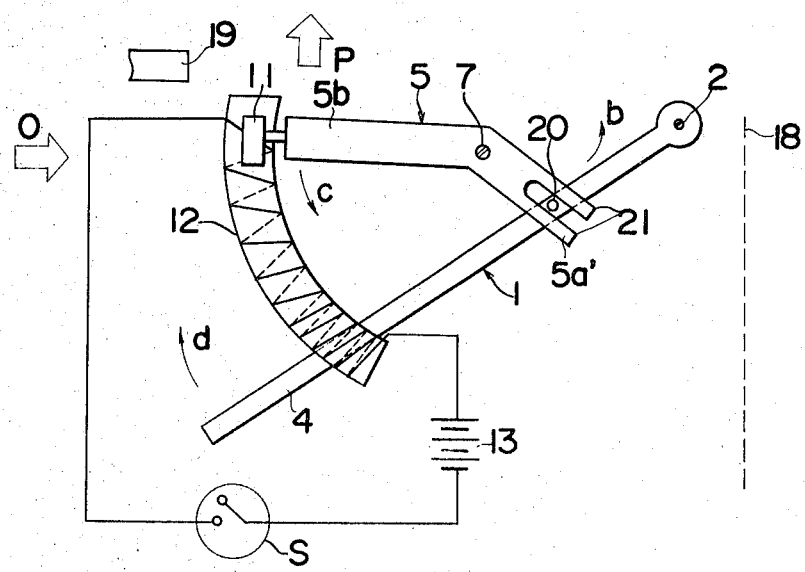

These and other objects and features of the present invention will become apparent from the following description taken in conjunction with preferred embodiments thereof with reference to the accompanying drawings, in which:

FIG. 1 is a schematic side view, partially broken away, showing a portion of a device associated with an electric circuit in accordance with one preferred embodiment of the present invention, for the purpose of illustrating the essential components thereof, and FIGS. 2 to 4 are respectively similar views to FIG. 1 showing the other embodiment of the present invention.

Before the description of the present invention proceeds, it is to be noted that, for the sake of brevity, like parts are designated by the like reference numerals throughout the several views of the accompanying drawings.

Referring to FIG. 1, showing a 1st embodiment of the present invention, there is shown a generally rectangular mirror frame 1, which is positioned at 45° to the optical axis of a lens assembly (not shown) except at the moment of exposure, and is located between an objective lens and a film 18. The mirror (not shown) contained in the frame 1 is intended to reflect an image of a scene to be photographed during a camera focusing stage, and to be swung upwards to a generally horizontal position in order to permit light from the scene to be photographed, as shown with an arrow O at the left of Figure, to pass through the lens and reach to film 18 at a film exposure stage. It is to be noted that, for the purpose of simplicity, in the description of this 1st embodiment of the invention, and of subsequent embodiments, directions or locations such as up show with a mark 'P', down, left show with a mark 'O', right shall be taken to mean as seen when a camera is in a normal upright position for taking a photograph, and a scene to be photographed and a film frame are on the left and right, respectively of the mirror in the frame 1, as shown in the Figures.

The mirror frame 1 is rotatably mounted at its upper end on a shaft 2 provided fixedly on a camera body in a known manner. There is also provided a conventionl means (not shown) whereby the mirror frame 1 and mirror therein are moved upwards to a generally horizontal position, in conjunction with the action of the camera shutter (also not shown). When the mirror frame 1 comes to a generally horizontal position in order to permit light to reach the film 18 it comes against a stopper 19. A long, thin slide groove 3 is provided along the longitudinal direction of the frame 1 in a generally upper portion 4 of a side of the frame 1. A slider 6 (shown in by a dotted line in the drawing) is slidably mounted in the slide groove 3. One end 5a of an arcuate lever 5 is fixedly attached to the slider 6. A rod, or plunger-like magnet 11, as described below, is fixedly provided to the other end 5b of the arcuate lever 5. The arcuate lever 5 is rotatably mounted on an off-centre shaft 7, which is fixedly positioned between the centre of the lever 5 and the end 5b thereof. One end 8a of a crank 8 is rotatably attached to the lever 5, at a point between the centre of the lever 5 and the end 5a thereof. The other, lower end 8b of the crank 8 is rotatably attached to an off-centre point in the right-hand portion of an elliptical, excentric cam 9. The cam 9 is rotatably mounted on a fixed shaft 10, which is fixedly located in a position that is generally adjacent to a focus of the cam 9. When the mirror frame 1 is in a normal viewfinder position, that is, at 45° to the optical axis of the camera lens assembly, the slider 6 is in the lower part of the slide groove 3, and the major axis of the elliptical cam 9 is generally horizontal. When, however, the mirror frame 1 is moved upwards to permit exposure of a film frame 18, the slider 6 is forced along the slide element 3, and is moved diagonally upwards in the direction shown with an arrow 'e' in FIG. 1. The arcuate lever 5 is therefore caused to pivot about the shaft 7, in accordance with the movement of the slider 6, one end 5a thereof following a curved path upwards in the direction shown with an arrow 'b', and the other end 5b following a curved path downwards in the direction shown with an arrow 'c'. At the same time the crank 8 is pulled upwards in the direction shown with an arrow 'g' in accordance with the rotation of the arcuate lever 5, thus causing the cam 9 to be rotated about the shaft 10 in an anticlockwise direction shown with an arrow 'a'.

The abovementioned magnet 11, fixed to the arcuate lever end 5b, is also moved downwards by downward movement of the end 5b. When the shaft end 5b is reached at the lowest point of the downward travel the magnet 11 is brought into vertical alignment with and adjacent to a tubular solenoid 12 provided fixedly on the camera body. The solenoid 12 is actuated by current brought to it from a direct-current power source 13, by switching elements 14, 15, 16, 17, which are described in further detail below. It is to be noted that magnetization of the magnet 11 and of the solenoid 12 are designed in such a manner that, when the arcuate shaft end 5b moves downwards, and the magnet 11 is brought adjacent to the solenoid 12, the respective fields of the magnet 11 and solenoid 12 oppose one another. That is, supposing the north pole of the magnet 11 to be at the lowermost end of the magnet 11, flow of current through the solenoid 12 is such that the north pole of the solenoid 12 is at the uppermost end thereof. The magnet 11 being fixed to the lever 5, this opposition of the two like fields of the magnet 11 and solenoid 12 imposes a restraint on movement of the lever 5.

Referring now to the abovementioned switching elements, one element is formed by a conductive spring plate 14, another element by a conductive plate 15 having a contact portion 16, and the other element by a dielectric block 17 provided between the two elements 14 and 15. One end of the spring plate 14 lies below, and is contacted by the elliptical cam 9 by the resilient force of itself, and the other end 14b thereof lies above the dielectric block 17. The spring plate 14 is connected to one terminal of the direct current power source 13. The other terminal of the power source 13 connects to one end of the coil of the solenoid 12. The other end of the coil of the solenoid 12 is connected to the conductive plate 15. The conductive plate 15 is positioned below the dielectric block 17, that is, on the opposite side to the spring plate 14. The plate 15 normally parallel to the spring plate 14 and is separated therefrom by a distance that is approximately equal to the thickness of the dielectric block 17. That portion of the plate 15 lying adjacent to the spring plate end 14a lying below the cam 9 is bent to form a contact portion 16, which is nearer to the spring plate 14 than the main body of the plate 15, but which is not normally contacted by the plate 14 when the major axis of the excentric cam 9 is horizontal. When, however, the excentric cam 9 is rotated the cam 9 pushes the spring plate 14 downwards in the direction shown with an arrow 'f', and into contact with the contact portion 16, thus closing the power supply circuit from the power source 13 to the solenoid 12.

The operation of the device of the 1st embodiment will be described hereinbelow.

When the camera shutter is actuated, the mirror frame 1 is swung upwards in the direction shown with an arrow 'd' by a conventional suitable means. The arcuate lever 5 is therefore pivoted about the shaft 7, and pulls the crank 8 upwards. The crank 8 causes the cam 9 to rotate about the fixed shaft 10, and press the spring plate 14 into contact with the contact portion 16 of the conductive plate 15. The solenoid 12 is therefore energized, and a magnetic field is set up therein, in this example, the north pole being at the uppermost end of the solenoid 12. Simultaneously with the spring plate 14 being pressed towards, and into contact with the contact portion 16, the arcuate lever end 5b and the magnet 11 attached thereto are moved steadily downwards in the direction shown with an arrow 'c' to the vicinity of the solenoid 12. In this example, the north pole of the magnet 11 is at the lower end thereof, and the north pole of the solenoid 12 is at the upper end thereof. Therefore, when the solenoid 12 is energized, the solenoid 12 north pole exerts a force which repels the magnet 11 north pole, and acts against the downwards movement of the magnet 11, and hence of the lever end 5b. This force increases, of course, the closer the magnet 11 comes to the solenoid 12. Downward movement of the shaft end 5b being thus restrained, rotation of the arcuate lever 5 about the shaft 7 is slowed, and at the same time the arcuate lever end 5a acts through the slider in the mirror frame slide element 3 to restrain upward movement of the mirror frame 1.

The various above-described elements are so proportioned that this restraining force acting against the upward movement of the mirror frame 1 is imposed just before the mirror frame 1 comes into contact with the stopper 19. Final contact of the mirror frame 1 with the stopper 19 is therefore buffered, and produces no shock of impact. It is to be noted that according to the means of the present invention, movement of a mirror frame is braked gently, since the restraining force is not applied suddenly, but gradually becomes stronger as the mirror frame approaches a stopper 19. It is also that according to the present invention not only is the movement of a mirror frame in a camera buffered gently, but also the strength of the buffering force and the moment at which it is applied are easily adjustable, by suitable variation of the force of the magnet 11 or solenoid 12, or by adjusting the distance between the plates 14, 15, all of which are simple procedures by a conventional means such as bolt and nut. Needless to say, the restraining force of the magnet 11 is preferably adjusted not so large as to push back the mirror frame 1 toward its original position against the rotational force of the conventional suitable means before the stopper 19.

Referring now to FIG. 2, (a), (b), (c), there is shown a 2nd embodiment of the present invention, which provides an improved switching arrangement for actuation of the solenoid 12. In this 2nd embodiment, the eccentric cam 9 is positioned between the levels of the plates 14, 15, and possesses a downwardly curved extension 9', which lies between the plates 14, 15. The plates 14, 15 are positioned on opposite sides of the dielectric block 17, as in the 1st embodiment. In the 2nd embodiment, however, the plate 15 is also formed by a conductive spring plate, and is positioned above the dielectric block 17 and is connected to the power source 13, and the spring plate 14 is positioned below the dielectric block 17 and provides connection to one end of the coil of the solenoid 12. The outer free end 15a of the plate 15, that is, the end opposite the plate 15 end attached to the dielectric block 17 is bent upwards, to permit a certain amount of free movement of the cam extension 9' during rotation of the cam 9. In a generally central portion the plate 15 forms a downwardly projecting contact portion 16.

In this arrangement, when the mirror frame 1 is in a normal position, the crank 8 attached to the lever 5 holds the cam 9 in an alignment in which the cam extension 9' presses the spring plate 14 downwards, and holds the plate 14 out of contact with the contact portion 16 as shown in FIG. 2(a). When, however, the lever 5 is caused to pivot about the shaft 7 by the mirror frame 1 being moved upwards, the crank 8 causes the cam 9 to rotate anticlockwise 'a', whereby the cam extension 9' comes to a position in which it contact neither plate 14 nor plate 15, and the pressure of the cam extension 9' on the spring plate 14 is removed. The spring plate 14 therefore moves upwards, due to its own elasticity, and comes into contact with the contact portion 16, as shown in FIG. 2, (b). As in the 1st embodiment, this contact between the plate 14 and contact portion 16 results in energization of the solenoid 12 and a buffering action, as described above. When the cam 9 is rotated further, the cam extension 9' comes into contact with, and pushes against the end 15b of the plate 15. The plate 15 is therefore pushed upwards, and the contact portion 16 is moved out of contact with the plate 14, as shown in FIG. 2(c). In other words, the power supply to the solenoid 12 is normally switched off, is switched on when the mirror frame 1 is moved upwards, and then is switched off again when the mirror fram 1 reaches its topmost position. Therefore, the solenoid 12 is cut during the time of exposure, 2nd embodiment of the invention offers the advantage of economy of the power supply.

Referring now to FIG. 3, there is shown a 3rd embodiment of the present invention. In this 3rd embodiment, the lever 5 is formed as a two-arm, bent lever, which pivots on the shaft 7. A magnet 11 is fixedly attached to one end 5b of the lever 5. The other end of the lever 5 extends slopingly past a side of the mirror fram 1, and forms a fork 21. A projecting pin 20 is formed on the side of the mirror frame 1, at a position between the centre of the mirror frame 1 and the shaft 2. The frame pin 20 fits slidably into the lever fork 21. When the mirror frame 1 is moved upwards, the pin 20 slides in, and presses against the side of the fork 21, thus causing the fork end 5a of the lever 5 to move upwards, the lever 5 to pivot about the shaft 7, and the lever end 5b, and magnet 11 attached thereto to be moved over a curved path downwards.

A printed coil 12 is fixedly disposed in a curve that follows the curved path over which the magnet 11 travels. The printed coil 12 may be any commercially available printed fixed coil, and the winding density thereof increases from the top thereof downwards. That is, as the magnet 11 moves downwards, it passes over, or cuts, an increasing number of coils per centimetre. Opposite ends of the coil 12 connect to opposite terminals of a power source 13. A normally open switch S is inserted in the coil 12 power source 13 circuit. Therefore, normally, that is at times other than when a film in the camera is being exposed, no current passes through the coil 12.

When the mirror frame 1 is moved upwards, to permit exposure of a film frame, the lever 5 is rotated, and the magnet 11 is moved downwards over the coil 12, as described before. Simultaneously with actuation of the suitable conventional means (not shown) for moving the mirror frame 1, the switch S is closed. The switch S may be closed be any suitable means, for example, by the switching means described in reference to 1st and 2nd embodiments. The power supply circuit to the coil 12 is thereby closed, and the coil 12 is energized. The power source 13 connections to the coil 12 are such that the magnet fields of the coil 12 and magnet 11 are in opposition. Therefore, the winding density of the coil 12 becoming greater towards the lower end thereof, opposition to downward movement of the magnet 11, increases steadily as the magnet 11 moves downwards. Downward movement of the magnet 11 being opposed by a steadily increasing force, rotatory movement of the lever 5 also is opposed by a steadily increasing force, and the lever 5, acting through the pin 20 and lever fork 11, imposes an increasing restraint on upward movement of the mirror frame 1. In other words, movement of the mirror frame 1 is gently braked, and this embodiment of the invention also provides an effective buffer preventing impact of the frame 1 and a stopper 19.

Referring now to FIG. 4, there is shown a 4th embodiment of the invention, which, like 3rd embodiment, is a flat construction, and which also presents the advantage of economy of space. In this 4th embodiment, the magnet 11 is fixed relative to the mirror frame 1 and other parts of the equipment. There is also provided a printed coil 12, which, like that of the 3rd embodiment, is disposed in a curve, has a gradually increasing coil density from the top end towards the lower end, and is connected through a normally open switch S to a power source 13. In the 4th embodiment, the coil 12 is stuck on, and by the periphery of, a rotary disk 23, and on one side thereof. The fixed magnet 11 lies over the periphery of the rotatory disk 23, and when the disk 23 is rotated, in a manner described below, the coil 12 passes under the magnet 11, the less dense portions of the coil 12 coming to the location of the fixed magnet 11 first, and increasingly denser portions of the coil 12 coming to the location of the magnet 11 as the disk 23 continues to be rotated.

The disk 23 is rotatably mounted on a fixed shaft 25. A gear wheel 24, which is fixedly attached to and concentric with the disk 23, is also rotatably mounted on the shaft 25. At one end of a lever 5, which pivots on a shaft 7, there is formed a fork 21, which fits slidably around a pin 20 mounted fixedly on the mirror frame 1. When the mirror frame 1 is moved upwards, the pin 20, acting on the fork 21 of the lever 5, causes the lever 5 to rotate anticlockwise, in the same manner as described in reference to the 3rd embodiment. The other end 5b of the lever 5 forms a fan-shaped gear 22 which engages the gear wheel 24. Therefore, when the mirror frame 1 is moved upwards, and the lever 5 is rotated anticlockwise 'c', the fan-shaped gear 22 moves downwards 'd', and causes the gear wheel 24 to rotate clockwise 'd'. The gear wheel 24 being fixedly attached to the rotary disk 23, clockwise rotation of the gear wheel 24 causes the rotatory disk 23 also to rotate clockwise 'd'. When the rotatory disk 23 rotates clockwise 'd', the printed fixed coil 12 struck thereto, and disposed in a curve following the periphery thereof, is moved under the fixed magnet 11.

When the means for moving the mirror frame 1 is actuated, the switch S is simultaneously closed, and the fixed coil 12 is energized. The energized coil 12 is moved by the magnet 11, as the mirror frame moves upwards. Increasingly denser portions of the coil 12 are brought to the location of the magnet 11, and this movement of the coil 12 relative to the magnet 11 has the same effective result as moving the magnet 11 relative to the coil 12, as in the 3rd embodiment. That is, an increasingly greater force opposes the downward movement of the magnet 11 and rotatory movement of the lever 5, and a smoothly applied braking force effectively acts as a buffer between the mirror frame 1 and a stopper 19.

As is clear from the above description, the present invention provides a device in which the magnetic repulsion between a solenoid or printed coil and a magnet on a lever actuated in conjunction with movement of a mirror in a camera acts as an efficient buffer to sudden stopping of the mirror, and prevents impact between the mirror and other parts of the camera. The buffer device of the present invention is actuated synchronously with actuation of the mirror by an accurate switching arrangement, which is easily adjusted to apply a buffering force of any required strength, and at any required moment during movement of the mirror. The device of the present invention is simple and cheap construction, and since use is made of electromagnetic means the invention overcomes the problems of wear and loss of efficiency.

The present invention thus overcomes the defects inherent in conventional device, and provides a camera mirror buffer means that is long-lasting, cheap, and effectively prevents damage to a mirror and disturbing noise during the taking of a photograph.

In the above-described embodiment, instead of moving a magnet in an opposed field increasing strength, it is possible to buffer mirror movement by means of a solenoid and plunger. In this case, the plunger is mechanically connected to the mirror, in such a manner that when the mirror moves upwards it acts to pull the plunger out of the solenoid. The solenoid is actuated before the mirror moves, so that the plunger is drawn in, and subsequent upward movement is sufficiently countered by the force drawing the plunger into the solenoid to provide a buffer action to prevent shock due to sudden stopping of the mirror.

Although the present invention has been fully described, by way of examples, it is to be noted that various changes and modifications are apparent to those skilled in the art. Therefore, unless otherwise they departs from the true scope of the present invention, they should be construed as included within said scope of the present invention.

What is claimed is:

1. In a single-lens reflex camera having a body, a film plane, a viewfinder and a mirror which is moved relative to the body simultaneously with shutter operation from a first position for introducing light to the viewfinder to a second position for introducing light to the film plane, an improved buffer device for the mirror, comprising:
   a. a magnet,
   b. electromagnetic means,
   c. switch means for energizing said electromagnetic means when said mirror is moved, and
   d. mechanical linkage means coupling said mirror to one of said magnet and electromagnetic means and arranged to cause relative movement between said magnet and said electromagnetic means in response to movement of said mirror, means mounting the other of said magnet and electromagnet to the camera body, to thereby produce a restraining force opposing such relative movement and hence opposing the relative movement of said mirror when said electromagnetic means is energized.

2. A camera mirror buffer device as defined in claim 1, wherein said magnet is stationarily positioned and said electromagnetic means is movable.

3. A camera mirror buffer device as defined in claim 1, wherein said electromagnetic means is stationarily positioned and said magnet is movable.

4. A camera mirror buffer device as defined in claim 1, wherein said switch means deenergizes said electromagnetic means when the mirror reaches a position of rest.

5. A camera mirror buffer device as defined in claim 1, wherein said electromagnetic means is a solenoid coil.

6. A camera mirror buffer device as defined in claim 1, wherein said electromagnetic means is a printed coil having increasing coil density in the direction of travel of said magnet relative to said printed coil for increasing the magnitude of the restraining force imposed on the movement of said mirror.

* * * * *